United States Patent
Lin et al.

(10) Patent No.: US 10,470,481 B2
(45) Date of Patent: Nov. 12, 2019

(54) PALATABILITY ENHANCER

(71) Applicant: Hill's Pet Nutrition, Inc., Topeka, KS (US)

(72) Inventors: Hungwei Lin, Lawrence, KS (US); Brent Pope, Topeka, KS (US)

(73) Assignee: Colgate-Palmolive Company, New York, NY (US)

( * ) Notice: Subject to any disclaimer, the term of this patent is extended or adjusted under 35 U.S.C. 154(b) by 650 days.

(21) Appl. No.: 14/654,128

(22) PCT Filed: Dec. 19, 2012

(86) PCT No.: PCT/US2012/070542
§ 371 (c)(1),
(2) Date: Jun. 19, 2015

(87) PCT Pub. No.: WO2014/098830
PCT Pub. Date: Jun. 26, 2014

(65) Prior Publication Data
US 2015/0342223 A1 Dec. 3, 2015

(51) Int. Cl.
| | |
|---|---|
| *A23K 50/40* | (2016.01) |
| *A23K 20/142* | (2016.01) |
| *A23K 20/158* | (2016.01) |
| *A23K 20/163* | (2016.01) |
| *A23K 20/10* | (2016.01) |
| *A23L 27/00* | (2016.01) |
| *A23L 27/20* | (2016.01) |
| *A23L 27/21* | (2016.01) |
| *A23L 27/26* | (2016.01) |

(52) U.S. Cl.
CPC ............ *A23K 50/40* (2016.05); *A23K 20/10* (2016.05); *A23K 20/142* (2016.05); *A23K 20/158* (2016.05); *A23K 20/163* (2016.05); *A23L 27/201* (2016.08); *A23L 27/215* (2016.08); *A23L 27/26* (2016.08); *A23L 27/88* (2016.08)

(58) Field of Classification Search
CPC .... A23K 50/40; A23K 20/142; A23K 20/158; A23K 20/163; A23K 20/10; A23L 27/88; A23L 27/26; A23L 27/201; A23L 27/215
See application file for complete search history.

(56) References Cited

U.S. PATENT DOCUMENTS

| | | | |
|---|---|---|---|
| 1,987,321 A * | 8/1935 | Calcott et al. | |
| 2,198,211 A | 4/1940 | Musher | |
| 2,282,782 A | 5/1942 | Musher | |
| 2,518,233 A * | 8/1950 | Hall | A23C 3/08 252/400.2 |
| 2,527,305 A * | 10/1950 | Halmbacher | C11B 1/025 435/219 |
| 3,282,115 A * | 11/1966 | Taylor | G01N 33/12 177/212 |
| 3,532,514 A * | 10/1970 | May | A23L 27/215 426/533 |
| 3,620,772 A * | 11/1971 | Nagayoshi | A23L 27/215 530/323 |
| 3,976,671 A | 8/1976 | Husch | |
| 4,044,168 A | 8/1977 | Steenhoek et al. | |
| 4,385,076 A | 5/1983 | Crosby | |
| 4,865,868 A | 9/1989 | Kuss | |
| 5,039,543 A * | 8/1991 | Lee | A23L 27/201 426/533 |
| 5,229,156 A | 7/1993 | Yokomizo et al. | |
| 5,320,862 A | 6/1994 | La Tona | |
| 5,944,012 A * | 8/1999 | Pera | A61K 9/0075 128/203.12 |
| 6,495,184 B1 * | 12/2002 | Zheng | A23L 27/215 426/533 |
| 7,455,865 B2 | 11/2008 | Buononato et al. | |
| 2005/0106285 A1 * | 5/2005 | Lee | A23K 40/30 426/2 |
| 2006/0088574 A1 * | 4/2006 | Manning | A23L 33/40 424/439 |
| 2006/0257455 A1 | 11/2006 | Chen et al. | |
| 2008/0008667 A1 | 1/2008 | Hoke et al. | |
| 2009/0136438 A1 * | 5/2009 | Dickman | A61K 8/44 424/60 |
| 2011/0189367 A1 * | 8/2011 | Sagalowicz | A23D 7/0053 426/533 |

(Continued)

FOREIGN PATENT DOCUMENTS

| | | |
|---|---|---|
| CN | CN101331935 A | 12/2008 |
| CN | CN102246979 | 11/2011 |
| GB | 505844 | 5/1939 |
| GB | 1115610 A * | 5/1968 ........... A23L 27/215 |

(Continued)

OTHER PUBLICATIONS

"Rancidity in Foods" downloaded from http://nem.org.uk/Rancidity.htm, 5 pages (Year: 2009).*
"Understanding Rancidity of Nutritional Lipids" downloaded from https://www.naturalproductsinsider.com/print/17005, 8 pages (Year: 2009).*
International Search Report and Written Opinion for International Application No. PCT/US2012/070542 dated Sep. 19, 2013.
Marti et al., "Where's the (Not) Meat?" USDA Report from the Economic Research Service, Nov. 2011, p. 1-30.
Rhee et al., "Lipid classes fatty acids, flavor and storage stability of washed sheep meat," J. of Food Science, Jan. 1998, 63(1):168-172.

*Primary Examiner* — C. Sayala

(57) ABSTRACT

Provided herein is a method of preparing a palatability enhancer for a food composition comprising combining an animal fat source and one or more agents in an aqueous solution to form a mixture, wherein said agents are selected from amino acids, sugars, vitamins, vegetable oils, flavorants and flavour precursors, heating the mixture at a pressure of 110 kPa to 800 kPa, obtaining a palatability enhancer from the mixture, wherein the palatability enhancer comprises animal fat in an amount of at least 80 wt %. Further provided is a method of enhancing the palatablity of a food composition.

12 Claims, No Drawings

(56) References Cited

U.S. PATENT DOCUMENTS

2012/0183654 A1* 7/2012 Zorich .................. A23L 3/3463
                                                          426/271
2012/0213889 A1    8/2012 Chiang

FOREIGN PATENT DOCUMENTS

| GB | 1223796 A | * | 3/1971 | ............. A23D 9/007 |
|----|-----------|---|--------|--------------------------|
| HU | 198529    |   | 10/1989 | |
| JP | 1036878   |   | 2/1998 | |
| JP | 2002265981 |  | 9/2002 | |
| JP | 2009291665 |  | 12/2009 | |
| WO | WO2007109761 | | 9/2007 | |
| WO | WO2009/095417 | | 8/2009 | |
| WO | WO2009095417 | | 8/2009 | |
| WO | WO2010008452 | | 1/2010 | |

* cited by examiner

PALATABILITY ENHANCER

BACKGROUND OF THE INVENTION

Animal fats such as pork fat, chicken fat, lamb tallow, and beef tallow are widely used for making animal food products. The raw materials used to produce these fats usually contain animal offal or viscera. The fats derived from these materials (in particular, inedible fats) usually have strong, undesirable odors (such as odors of blood, feces, ammonia, and rot) which are offensive to humans.

It would be desirable to reduce or mask the offensive odors of animal fats, and in particular, inedible animal fats, to improve their aromatic characteristics for pet owners, and to enhance their palatability for the animal consumers.

In designing foods for animals, particularly companion animals such as cats and dogs, optimal animal health or wellness through good nutrition is an important goal. However, even the most nutritious animal food is of little value if the animal rejects or refuses to eat the food, or if the animal's intake of the food is restricted because the animal finds the food unpalatable.

Enticing a companion or other animal to eat can be an expensive and time consuming chore. Foods with varying moisture content, supplements, and treats have been developed to encourage animals to eat. However, these solutions to the problem are not always effective.

Numerous potential palatability enhancers are available for animals. In order to be effective, palatability enhancers require certain properties. Firstly, a potential palatability enhancer should be compatible with the food composition during processing and packaging and it should possess a practical extended shelf-life. Secondly, the palatability enhancer should be appealing to the animal's sense of taste and smell, whilst being physically attractive. Thirdly, a palatability enhancer should be compatible with the animal after ingestion such that it does not cause any significant problems to the animal, particularly gastrointestinal problems.

Some palatability enhancers are commercially available as flavoring agents. Others are continually being synthesized anew, extracted from natural products, or digested from various animal organs. The success of these materials in compositions for animal consumption is often unpredictable. Therefore, there is a need for new palatability enhancers that increase the palatability of compositions for consumption by an animal.

BRIEF SUMMARY OF THE INVENTION

The present inventors have found that when animal fat, and in particular inedible animal fat, is heated with an aqueous solution of agents including amino acids, sugars, vitamins, vegetable oils, and flavorants, at high pressure, the flavor characteristics of the fat are altered and undesirable odors are reduced. After heating at high pressure, the aqueous phase may be removed to provide an animal fat which has meaty, sweet, roasted or smoked aromatic characteristics that are more desirable for pet owners. Furthermore, the present inventors have unexpectedly found that animal fat processed according to the present invention unexpectedly enhances the palatability of food compositions.

Accordingly, in a first aspect, the present invention provides a method of preparing a palatability enhancer for a food composition, wherein the method comprises:
a) combining an animal fat source and one or more agents in an aqueous solution to form a mixture, wherein said agents are selected from amino acids, sugars, vitamins, vegetable oils, flavorants and flavor precursors,
b) heating the mixture at a pressure of 110 kPa to 800 kPa,
c) obtaining a palatability enhancer from the mixture, wherein the palatability enhancer comprises animal fat in an amount of at least 80 wt %.

Optionally, the palatability enhancer comprises animal fat in an amount of at least 90 wt %. Further optionally, the palatability enhancer consists essentially of animal fat.

Typically, in step a), the animal fat source is combined with one or more amino acids, one or more sugars, one or more vegetable oils, and optionally, one or more further agents selected from vitamins, vegetable oils, flavorants and flavor precursors.

Typically, the amino acid is selected from glycine, cysteine, alanine arginine, alanine, asparagine, cysteine, glycine, glutamine, iso-leucine, leucine, lysine, methionine, proline, serine, tyrosine and valine. The mixture may comprise one or more amino acids in an amount of 0.1 wt % to 3 wt %, or in an amount of 0.5 wt % to 2 wt %.

Typically, the sugar is selected from dextrose, glucose, fructose, maltose, lactose, arabinose, xylose, ribose, mannose, erythrose, threose and galactose. Optionally, the mixture comprises one or more sugars in an amount of 0.5 wt % to 3 wt %, or in an amount of 1 wt % to 2.5 wt %.

Typically, the flavorant is selected from a protein flavorant, a smoke flavorant and an herb and/or herb extract flavorant. Sources of protein flavorants include intact tissue or hydrolyzed pork, chicken, poultry, lamb, goat, deer, venison, yeast, and mushroom. Sources of an herb and/or herb extract flavorant include herb and/or herb extracts such as garlic, onion, basil, saffron and rosemary. Optionally, the mixture comprises one or more flavorants in an amount of 0.1 wt % to 4 wt %., or in an amount of 0.1 wt % to 2 wt %.

Typically, the vegetable oil is selected from soybean oil, rapeseed oil, coconut oil, palm oil, peanut oil, corn oil, cottonseed oil, safflower oil and cottonseed oil. Optionally, the mixture comprises vegetable oil in an amount of 0.5 wt % to 3 wt %, or in an amount of 1 wt % to 2.5 wt %.

Typically, the vitamin is selected from vitamin A, vitamin B1 (thiamine), vitamin B2 (riboflavin), vitamin B6 (Niacin), vitamin B12, (cyanocobalamin), pantothenic acid, biotin, vitamin C, vitamin D and vitamin E. Optionally, the mixture comprises one or more vitamins in an amount of 0.01 wt % to 0.5 wt %, or in an amount of 0.1 wt % to 0.3 wt %.

Typically, the animal fat source comprises pork fat, chicken fat, poultry fat, lamb tallow or beef tallow. Optionally, the animal fat source comprises inedible animal fat. Still further optionally, the animal fat source consists essentially of inedible animal fat.

Typically, the flavor precursor is selected from an intact protein, a hydrolyzed protein or a vegetable protein. Optionally, the mixture comprises one or more flavor precursors in an amount of from 0.5 wt % to 3 wt %.

Typically, step c) comprises isolating a fraction from the mixture, wherein the isolated fraction comprises animal fat in an amount of at least 80 wt %, and wherein the palatability enhancer comprises the isolated fraction. Optionally, the palatability enhancer comprises the isolated fraction and one or more further food ingredients. Alternatively, the palatability enhancer consists essentially of the isolated fraction. Further optionally, the fraction is isolated from the mixture by centrifugation. Further optionally, the fraction is isolated from the mixture by gravity separation such as settling or precipitating. Still further optionally, during isolation of the fraction comprising the animal fat, the fraction is separated from an aqueous phase of the mixture. The aqueous phase of the mixture may comprise one or more fatty acids.

Typically, in step b), the mixture is heated at a pressure of from 150 kPa to 600 kPa. Optionally, the pressure is from 200 kPa to 400 kPa. Further optionally, the pressure is from 250 kPa to 300 kPa. Still further optionally, step b) is carried out in an enclosed vessel.

Typically, the mixture is heated to a temperature of from 80° C. to 230° C. Optionally, the mixture is heated to a temperature of from 100° C. to 180° C. Further optionally, the mixture is heated to a temperature of from 110° C. to 150° C.

Typically, in step b), the mixture is heated for 1 minute to 120 minutes. Optionally, the mixture is heated for 20 minutes to 60 minutes.

Typically, the mixture is cooled prior obtaining the palatability enhancer in step c). Optionally, the mixture is cooled to a temperature of from 40° C. to 90° C.

Typically, one or more antioxidants are incorporated into the mixture, optionally, after heating the mixture. The antioxidant may be selected from BHA, BHT, propyl gallate, exothyquin, alpha tocopherol, beta tocopherol, gama tocopherol, delta tocopherol, rosemary extract, ascorbic acid (or vitamin C), ascorbyl palmitate, citric acid and tea extract. Optionally, mixture comprises one or more antioxidants in an amount of 0.01 wt % to 0.5 wt %. Further optionally, the mixture comprises one or more antioxidants in an amount of 0.1 wt % to 0.3 wt %.

Optionally, the mixture further comprises sodium hydroxide. Typically, the pH of the aqueous solution of one or more agents is from 3.0 to 9.8. Optionally, the pH of the aqueous solution of one or more agents is from 4.0 to 8.5.

In a second aspect, the present invention provides a food composition comprising at least one food ingredient, and a palatability enhancer obtained by the method described herein.

In a third aspect, the present invention provides, a method of enhancing the palatability of a food composition comprising:
a) combining an animal fat source and one or more agents in an aqueous solution to form a mixture,
wherein said agents are selected from amino acids, sugars, vitamins, vegetable oils, flavorants and flavor precursors,
b) heating the mixture at a pressure of 110 kPa to 800 kPa,
c) isolating a fraction from the mixture, wherein the fraction comprises animal fat in an amount of at least 80 wt %,
d) incorporating the fraction comprising the animal fat into the food composition to enhance the palatability of the food composition. Optionally, the fraction comprises animal fat in an amount of at least 90 wt %. Still further optionally, the fraction consists essentially of animal fat.

Typically, in step a), the animal fat source is combined with one or more amino acids, one or more sugars, one or more vegetable oils, and optionally, one or more further agents selected from vitamins, vegetable oils, flavorants and flavor precursors.

Typically, the amino acid is selected from glycine, cysteine, alanine arginine, alanine, asparagine, cysteine, glycine, glutamine, iso-leucine, leucine, lysine, methionine, proline, serine, tyrosine and valine. The mixture may comprise one or more amino acids in an amount of 0.1 wt % to 3 wt %, or in an amount of 0.5 wt % to 2 wt %.

Typically, the sugar is selected from dextrose, glucose, fructose, maltose, lactose, arabinose, xylose, ribose, mannose, erythrose, threose and galactose. Optionally, the mixture comprises one or more sugars in an amount of 0.5 wt % to 3 wt %, or in an amount of 1 wt % to 2.5 wt %.

Typically, the flavorant is selected from a protein flavorant, a smoke flavorant and an herb and/or herb extract flavorant. Sources of protein flavorants include intact tissue or hydrolyzed pork, chicken, poultry, lamb, goat, deer, venison, yeast, and mushroom. Sources of an herb and/or herb extract flavorant include herb and/or herb extracts such as garlic, onion, basil, saffron and rosemary. Optionally, the mixture comprises one or more flavorants in an amount of 0.1 wt % to 4 wt %, or in an amount of 0.1 to 2 wt %.

Typically, the vegetable oil is selected from soybean oil, rapeseed oil, coconut oil, palm oil, peanut oil, corn oil, cottonseed oil, sunflower oil, safflower oil and cottonseed oil. Optionally, the mixture comprises vegetable oil in an amount of 0.5 wt % to 3 wt %., or in an amount of 1 wt % to 2.5 wt %.

Typically, the vitamin is selected from vitamin A, vitamin B1 (thiamine), vitamin B2 (riboflavin), vitamin B6 (Niacin), vitamin B12, (cyanocobalamin), pantothenic acid, biotin, vitamin C, vitamin D and vitamin E. Optionally, the mixture comprises one or more vitamins in amount of 0.01 wt % to 0.5 wt %, or in an amount of 0.1 wt % to 0.3 wt %.

Typically, the animal fat source comprises pork fat, chicken fat, poultry fat, lamb tallow or beef tallow. Optionally, the animal fat source comprises inedible animal fat. Still further optionally, the animal fat source consists essentially of inedible animal fat.

Typically, the flavor precursor is selected from an intact protein, a hydrolyzed protein or a vegetable protein. Optionally, the mixture comprises one or more flavor precursors in an amount of from 0.5 wt % to 3 wt %.

Optionally, the isolated fraction is combined with one or more further food ingredients prior to incorporation into the food composition. Further optionally, the fraction is isolated by centrifugation. Further optionally, the fraction is isolated by gravity separation such as settling or precipitating. Still further optionally, during isolation of the fraction comprising the animal fat, the fraction is separated from an aqueous phase of the mixture. The aqueous phase may comprise one or more fatty acids.

Typically, the heating in step b) is carried out at a pressure of from 150 kPa to 600 kPa. Optionally, the pressure is from 200 kPa to 400 kPa. Further optionally, the pressure is from 250 kPa to 300 kPa. Still further optionally, the step b) is carried out in an enclosed vessel.

Typically, the mixture is heated to a temperature of from 80° C. to 230° C. Optionally, the mixture is heated to a temperature of from 100° C. to 180° C. Further optionally, the mixture is heated to a temperature of from 110° C. to 150° C.

Typically, in the treating step, the mixture is heated for 1 minute to 120 minutes. Optionally, the mixture is heated for 20 minutes to 60 minutes.

Typically, the mixture is cooled prior to isolating the fraction in step c). Optionally, the mixture is cooled to a temperature of from 40° C. to 90° C.

Typically, one or more antioxidants are incorporated into the mixture after the treating step. The antioxidant may be selected from BHA, BHT, propyl gallate, exothyquin, alpha tocopherol, beta tocopherol, gama tocopherol, delta tocopherol, rosemary extract, ascorbic acid (or vitamin C), ascorbyl palmitate, citric acid and tea extract. Optionally, mixture comprises one or more antioxidants in an amount of 0.01 wt % to 0.5 wt %. Further optionally, the mixture comprises one or more antioxidants in an amount of 0.1 wt % to 0.3 wt %.

Optionally, the mixture further comprises sodium hydroxide. Typically, the pH of the aqueous solution of one or more agents is from 3.0 to 9.8. Optionally, the pH of the aqueous solution of one or more agents is from 4.0 to 8.5.

In a fourth aspect, the present invention provides a food composition obtained by the method described herein, wherein the food composition comprises at least one food ingredient.

In a fifth aspect, the present invention provides a composition comprising:
80 wt % to 90 wt % animal fat,
1 wt % to 7 wt % water,
0.5 wt % to 3 wt % vegetable oil,
0.1 wt % to 3 wt % amino acids,
0.5 wt % to 3 wt % sugars,
0.1 wt % to 4 wt % flavorants,
0.01 wt % to 0.5 wt % vitamins, and
0.01 wt % to 0.5 wt % antioxidants.

Optionally, the composition comprises:
85 wt % to 88 wt % animal fat,
4 wt % to 6 wt % water,
1 wt % to 2.5 wt % vegetable oil,
0.5 wt % to 2 wt % amino acids,
1 wt % to 2.5 wt % sugars,
0.1 wt % to 2 wt % flavorants,
0.1 wt % to 0.3 wt % vitamins, and
0.1 wt % to 0.3 wt % antioxidants.

In a sixth aspect, the present invention provides a method for reducing the odor of inedible animal fat,
wherein the method comprises:
a) combining an animal fat source and one or more agents in an aqueous solution so as to form a mixture,
wherein said agents are selected from amino acids, sugars, vitamins, vegetable oils, and flavorants,
b) heating the mixture at a pressure of 110 kPa to 800 kPa
c) isolating a reduced-odor fraction from the mixture, wherein the fraction comprises animal fat in an amount of at least 80 wt %.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE INVENTION

The following description of the preferred embodiment(s) is merely exemplary in nature and is in no way intended to limit the invention, its application, or uses.

As used herein, the term 'aqueous solution' refers to any mixture comprising water.

As referred to herein, all pressure values correspond to absolute pressure values.

As used herein, the term "food" may refer not only to a food product which typically provides most, if not all, the nutrient value for an animal, but may also refer to such items as a snack, treat, and supplement.

In some embodiments, the present invention provides method of preparing a palatability enhancer for a food composition, wherein the method comprises:
a) combining an animal fat source and one or more agents in an aqueous solution to form a mixture,
wherein said agents are selected from amino acids, sugars, vitamins, vegetable oils, flavorants and flavor precursors,
b) heating the mixture at a pressure of 110 kPa to 800 kPa,
c) obtaining a palatability enhancer from the mixture, wherein the palatability enhancer comprises animal fat in an amount of at least 80 wt %.

Step c) may comprise isolating a fraction from the mixture, wherein the isolated fraction comprises animal fat in an amount of at least 80 wt %. The palatability enhancer may comprise or consist of the isolated fraction. In one arrangement, the palatability enhancer comprises the isolated fraction and one or more food ingredients as defined herein.

In other embodiments, the present invention provides, a method of enhancing the palatability of a food composition comprising:
a) combining an animal fat source and one or more agents in an aqueous solution to form a mixture,
wherein said agents are selected from amino acids, sugars, vitamins, vegetable oils, flavorants and flavor precursors,
b) heating the mixture at a pressure of 110 kPa to 800 kPa,
c) isolating a fraction from the mixture, wherein the fraction comprises animal fat in an amount of at least 80 wt. %,
d) incorporating the fraction comprising the animal fat into the food composition to enhance the palatability of the food composition.

In yet other embodiments, the present invention provides a method of reducing the odor of inedible animal fat,
wherein the method comprises:
a) combining an animal fat source and one or more agents in an aqueous solution so as to form a mixture, wherein said agents are selected from amino acids, sugars, vitamins, vegetable oils, flavorants and flavor precursors,
b) heating the mixture at a pressure of 110 kPa to 800 kPa
c) isolating a reduced-odor fraction from the mixture, wherein the fraction comprises animal fat in an amount of at least 80 wt %.

By "reduced-odor fraction" it is meant that the odor of the fraction is more desirable or pleasant than the odor of the animal fat source before combination with the one or more agents in step a).

The animal fat source of the present invention may comprise fabricated meat (which includes fat, bones, and other animal parts) or offal from slaughtering (which includes viscera, intestines, fats, tendons and carcasses), originating, without limitation, from cattle, poultry, horses, sheep, and pigs.

Typically, animal fat is rendered and filtered from the above raw materials by methods known to the person skilled in the art before use in the methods of the present invention. In the rendering process, fabricated meat and/or offal may be finely chopped or ground, and heated to a temperature of 80° C. to 130° C., with or without added steam, to denature the protein. After heating, the fat, usually in liquid form, is separated from the solid material (meal), optionally by centrifugation. Typically, the fat is subjected to further centrifugation at high temperatures (for example, from 80° C. to 100° C.) in order to remove fines and moisture. After centrifugation, the fat may be used in the methods of the present invention. Alternatively, the animal fat source may be used in the methods of the present invention without any treatment.

In one arrangement, the animal fat source for use in the present invention comprises pork fat, chicken fat, poultry fat, lamb tallow or beef tallow, or a combination thereof. One example of pork fat that may be used in Choice White Grease. Other animal fat sources that may be used include goose fat and duck fat.

Preferably, the animal fat source comprises inedible fat. More preferably, the animal fat source consists essentially of inedible fat. The term 'inedible fat' as used herein denotes fats or tallows that have been extracted and separated by rendering some or all of inedible animal parts including offal, bones, trims from meat fabrication, hides, skins, blood, and carcass.

Typically, the animal fat source, and in particular, the inedible animal fat is in liquid form at room temperature (for example, 20° C. to 25° C.).

The animal fat source or animal fat may be present in the mixture comprising the at least one or more agents in an aqueous solution in an amount of from 75 wt % to 95 wt %. Optionally, the animal fat source or animal fat is present in the mixture in an amount of from 80 wt % to 90 wt %. Preferably, the animal fat source or animal fat is present in the mixture in an amount of from 81 wt %, or 82 wt %, or 83 wt %, or 84 wt %, to 85 wt %, or 86 wt %, or 87 wt %, or 88 wt %, or 89 wt %. In one embodiment, the mixture comprises from 85 wt % to 88 wt % of the animal fat source or animal fat.

In step a), the animal fat source, or animal fat, is combined with one or more agents in aqueous solution to form a mixture, wherein the agents are selected from amino acids, sugars, vitamins, vegetable oils and flavorants.

In one arrangement, all the solid ingredients which may include sugars, amino acids, flavorants and vitamins, are blended with water. Animal fat, vegetable oil(s), and further flavorants are then blended separately, and incorporated into the aqueous blend to form a mixture. Optionally, the mixture is agitated to ensure all the ingredients become dissolved and are thoroughly mixed. In another arrangement, an aqueous blend or solution of all the agents selected from amino acids, sugars, vitamins, vegetable oils and flavorants is prepared, and combined with the animal fat source or animal fat to form a mixture. Preferably, in mixing step a), the animal fat source or animal fat is combined with at least one or more amino acids, sugars and vegetable oil.

Water may be present in the mixture in an amount of to 10 wt %. Optionally, the amount of water present in the mixture is from 1 wt %, or 2 wt %, or 3 wt % to 7 wt %, or 8 wt % or 9 wt %, or 10 wt %. Preferably, the amount of water in the mixture is from 4 wt % to 6 wt %. The water in the mixture not only effectively dissolves the solid ingredients for dispersion, but also increases reaction efficacy by promoting close contact between the reactants. Furthermore, the water may assist subsequent phase separation during isolation step by trapping undesirable water-soluble materials (see 'isolation step' below).

Any amino acid may be incorporated into the mixture. Amino acids may include without limitation, histidine, isoleucine, leucine, lysine, methionine, phenylalanine, threonine, tryptophan, alanine, arginine, aspartate, cysteine, glutamate, glutamine, glycine, proline, valine and serine. In one arrangement, the amino acid is selected from glycine, cysteine, alanine arginine, alanine, asparagine, cysteine, glycine, glutamine, iso-leucine, leucine, lysine, methionine, proline, serine, tyrosine and valine.

In one arrangement, the mixture comprises one or more amino acids in an amount of from 0.1 wt % to 3 wt %. Optionally, the mixture comprises one or more amino acids in an amount of from 0.5 wt % to 2 wt %. Further optionally the mixture comprises one or more amino acids in an amount of from 0.5 wt %, or 0.6 wt %, or 0.7 wt %, or 0.8 wt %, or 0.9 wt %, or 1 wt % to 1.5 wt %, or 1.6 wt %, or 1.7 wt %, or 1.8 wt %, or 1.9 wt %, or 2 wt %. Preferably, the mixture comprises one or more amino acids in an amount of 1 wt % to 2 wt %, or from 1.2 wt % to 1.6 wt %.

Any sugar may be incorporated into the mixture. Sugars include, without limitation, dextrose, glucose, fructose, maltose, lactose, arabinose, xylose, ribose, mannose, erythrose, threose and galactose. Preferably, the sugar is selected from dextrose, xylose, or fructose.

In one arrangement, the mixture comprises one or more sugars in an amount of 0.1 wt % to 4 wt %. Optionally, the mixture comprises one or more sugars in an amount of from 0.5 wt % to 3 wt %. Further optionally the mixture comprises one or more sugars in an amount of from 1.3 wt %, or 1.4 wt %, or 1.5 wt %, or 1.6 wt %, or 1.7 wt %, or 1.8 wt % to 2 wt %, or 2.1 wt %, or 2.2 wt %, or 2.3 wt %, or 2.4 wt %, or 2.5 wt %. Preferably, the mixture comprises one or more sugars in an amount of 1.5 wt % to 2.5 wt %, or from 1.8 wt % to 2.2 wt %.

Any flavorant may be incorporated into the mixture. Flavorants include, without limitation, protein flavorants and smoke flavorants. Preferably, charbroil mesquite (a liquid smoke flavorant) is incorporated into the mixture. Yeast flavorants may also be incorporated into the mixture. One example of a yeast flavorant is the commercially available Provesta 032. The person skilled in the art would be aware of other flavorants that may be used. protein flavorant, a smoke flavorant and an herb and/or herb extract flavorant. Sources of protein flavorants include intact tissue or hydrolyzed pork, chicken, poultry, lamb, goat, deer, venison, yeast, and mushroom. Sources of an herb and/or herb extract flavorant include herb and/or herb extracts such as garlic, onion, basil, saffron and rosemary.

Typically, the flavor precursor is selected from an intact protein, a hydrolyzed protein or a vegetable protein. Optionally, the mixture comprises one or more flavor precursors in an amount of from 0.5 wt % to 3 wt %.

In one arrangement, the mixture comprises one or more flavorants in an amount of 0.1 wt % to 4 wt %. Optionally, the mixture comprises one or more sugars in an amount of from 0.1 wt % to 2 wt %. Further optionally the mixture comprises one or more flavorants in an amount of from 1.5 wt %, or 1.6 wt %, or 1.7 wt %, or 1.8 wt %, or 1.9 wt %, to 2 wt %, or 2.1 wt %, or 2.2 wt %, or 2.3 wt %, or 2.4 wt %, or 2.5 wt %. Preferably, the mixture comprises one or more flavorants in an amount of 2 wt % to 3 wt %, or from 2.2 wt % to 2.6 wt %.

Any vegetable oil may be incorporated into the mixture. Vegetable oils include, without limitation, soybean oil, rapeseed oil, coconut oil, palm oil, peanut oil, corn oil, sunflower oil, safflower oil and cottonseed oil.

In one arrangement, the mixture comprises one or more vegetable oils in an amount of 0.1 wt % to 3 wt %. Optionally, the mixture comprises one or more vegetable oils in an amount of from 1 wt % to 2.5 wt %. Further optionally the mixture comprises one or more vegetable oils in an amount of from 1.3 wt %, or 1.4 wt %, or 1.5 wt %, or 1.6 wt %, or 1.7 wt %, or 1.8 wt % to 2 wt %, or 2.1 wt %, or 2.2 wt %, or 2.3 wt %, or 2.4 wt %, or 2.5 wt %. Preferably, the mixture comprises one or more vegetable oils in an amount of 1.5 wt % to 2.5 wt %, or from 1.8 wt % to 2.2 wt %.

Incorporation of at least one vegetable oil is technically advantageous as it increases the fluidity of the treated animal fat that is obtained after isolation resulting in a treated animal fat that is more pourable, and consequently, easier to handle.

Any vitamin may be incorporated into the mixture. Vitamins include, without limitation, vitamin A, vitamin B1 (thiamine), vitamin B2 (riboflavin), vitamin B6 (Narcin), vitamin B12, (cyanocobalamin), pantothenic acid, biotin, vitamin C, vitamin D and vitamin E. In one arrangement, thiamine hydrochloride is incorporated into the mixture. In another arrangement, a vitamin mixture comprising two or more vitamins is incorporated into the mixture.

In one arrangement, the mixture comprises one or more vitamins in an amount of 0.01 wt % to 0.5 wt %. Optionally, the mixture comprises one or more vitamins in an amount of from 0.1 wt % to 0.3 wt %. Further optionally the mixture comprises one or more vitamins in an amount of from 0.1 wt %, or 0.15 wt %, or 0.2 wt %, to 0.25 wt %, or 0.3 wt %, or 0.35 wt %, or 0.4 wt %, or 0.45 wt %, or 0.5 wt %. Preferably, the mixture comprises one or more vitamins in an amount of 0.1 wt % to 0.3 wt %, or from 0.2 wt % to 0.3 wt %.

In one embodiment, an alkaline agent may be incorporated into the aqueous solution comprising one or more agents. Preferably, the alkaline agent is an alkali metal hydroxide such as sodium hydroxide, potassium hydroxide or calcium hydroxide.

A sufficient amount of alkaline agent may be added to obtain a pH of from 3.0 to 9.8. Preferably, the pH of the aqueous solution is from 4.0 to 8.5. Typically, the incorporation of animal fat into the aqueous solution comprising one or more agents does not significantly alter the pH. Therefore, the pH of the aqueous solution may be the same as the pH of the mixture.

The present inventors have unexpectedly found that by increasing the pH value of the aqueous solution, the neutralization of odorous fatty acids and other reactions to impart flavor to the animal fat, are enhanced.

In one arrangement, the mixture obtained from combining an animal fat source with one or more of the agents as defined above is heated at high temperatures and at supra-atmospheric pressures. The mixture may be transferred to a reaction vessel which is capable of heating the mixture at supra-atmospheric pressures. Suitable apparatuses would be familiar to the person skilled in the art. The reaction vessel may comprise a means for agitation such that the mixture may further be agitated during heating. Preferably, the reaction vessel is closed during heating.

Typically, the mixture is heated to a temperature from 70° C. to 250° C., or from 80° C. to 230° C. In one arrangement, the mixture is heated to a temperature from 90° C., or 100° C., or from 110° C. to 150° C. or from 160° C. or 170° C. In another arrangement, the mixture is heated to a temperature from 150° C., or 160° C., or 170° C. to 180° C. or 190° C. or 200° C. Preferably, the mixture is heated to a temperature from 100° C. to 180° C., and more preferably, from 110° C. to 150° C.

Typically, the mixture is heated for from 1 minute to 120 minutes, or from 20 minutes to 100 minutes. In one arrangement, the mixture is heated for from 50 minutes, or 60 minutes, or 70 minutes to 80 minutes, or 90 minutes or 100 minutes. In another arrangement, the mixture is heated for from 20 minutes, or 30 minutes to 40 minutes or 50 minutes. Preferably, the mixture is heated for from 20 minute to 60 minutes, and more preferably, from 20 minutes to 30 minutes.

Typically, the heating is carried out at supra-atmospheric pressure. Thus, the heating may be carried out at a pressure from 105 kPa, or 110 kPa, or 120 kPa, or 130 kPa, or 140 kPa, or 150 kPa to 800 kPa. In one embodiment, the treating step is carried out at a pressure of from 110 kPa to 800 kPa, or from 150 kPa to 600 kPa, or from 170 kPa to 500 kPa, or from 200 kPa to 300 kPa. In another embodiment, the treating step is carried out a pressure of from 200 kPa or 250 kPa, or 300 kPa, to 500 kPa, or 550 kPa, or 600 kPa, or 650 kPa, or 700 kPa.

The pressure inside the reaction vessel may arise from water vapour pressure during the reaction. Additionally, carbon dioxide (which is incompressible) may be emitted during the reaction process, further contributing to the supra-atmospheric pressure inside the vessel. Typically, the pressure is kept constant throughout the heating step.

Animal fats, and particularly, inedible animal fats, usually have strong, undesirable odors. The odors may be attributed to a wide range of compounds or molecules including skatols, indoles, p-cresols, thiols, biogenic amines, and short chain and branched chain fatty acids. Fatty acids may include, for example, propionic acid, butyric acid, pentanoic acid and hexanoic acid). These compounds and molecules may originate from microbial fermentation and biological decomposition of the fat.

The present inventors have found that when an animal fat source, and particularly an animal fat source comprising or consisting of inedible fat, is heated at high temperatures and pressures as defined above, chemical reactions occur which change the flavor characteristics of the animal fat and reduce the odor of the animal fat. Chemical reactions include, but are not limited to, neutralization reactions and Maillard reactions.

Accordingly, the methods described herein may further comprise reducing the odor of animal fat.

After heating the animal fat as described herein, the mixture may optionally be cooled prior to isolating a fraction comprising animal fat in an amount of 80 wt % from the mixture, and/or obtaining the palatability enhancer. Preferably, the mixture is cooled to a temperature of from 25° C. to 70° C., or from 40 C to 70° C. More preferably, the mixture is cooled to a temperature of from 45° C., or 55° C. One or more antioxidants may be incorporated into the mixture. Antioxidants include, without limitation, BHA, BHT, propyl gallate, exothyquin, alpha tocopherol, beta tocopherol, gama tocopherol, delta tocopherol, rosemary extract, ascorbic acid (or vitamin C), ascorbyl palmitate, citric acid and tea extract. Preferably, the antioxidant comprises rosemary extract, tea extract, tocopherols, ascorbic acid and ascorbyl palmitate. Antioxidant mixtures comprising at least two antioxidants may also be used.

Preferably, the one or more antioxidants are incorporated into the mixture after cooling. In an alternative arrangement, the one or more antioxidants may be incorporated into the mixture during cooling. In yet another alternative arrangement, the one or more antioxidants may be incorporated into the mixture during step a) and prior to heating when the animal fat source is combined with one or more agents as defined herein. Preferably, the one or more antioxidants are incorporated into the mixture prior to isolating the fraction and/or obtaining the palatability enhancer.

In one arrangement, the mixture comprises one or more antioxidants in an amount of 0.005 wt % to 0.5 wt %. Optionally, the mixture comprises one or more antioxidants in an amount of from 0.01 wt % to 0.3 wt %. Further optionally the mixture comprises one or more antioxidants in an amount of from 0.05 wt %, or 0.1 wt %, or 0.15 wt %, or 0.2 wt %, or 0.25 wt %, to 0.3 wt %, or 0.35 wt %, or 0.4 wt %, or 0.45 wt %, or 0.5 wt %. Preferably, the mixture comprises one or more antioxidants in an amount of 0.05 wt % to 0.25 wt %, or from 0.1 wt % to 0.2 wt %.

The palatability enhancer may be obtained from the mixture. In one arrangement, a fraction comprising the animal fat is isolated from the mixture. The palatability enhancer may comprise or consist of the isolated fraction. In one arrangement, the palatability enhancer comprises the isolated fraction and one or more food ingredients as defined herein.

Preferably, the isolated fraction comprises at least 80 wt % or at least 90 wt % animal fat. More preferably, the isolated fraction consists essentially of animal fat. Typically, the fraction has a reduced odor relative to the animal fat source or animal fat that is combined with the agents defined herein.

Typically in the isolation process, the mixture is transferred to another vessel and centrifuged. Appropriate speeds and duration of centrifugation would be known to the person skilled in the art, but may range from 1000 rpm to 3000 rpm, for 30 seconds to 2 minutes. During isolation, the fraction comprising the animal fat may be visible as a lipid layer (light phase) on top of an aqueous layer (heavy phase). Preferably, the fraction comprising the animal fat is isolated by siphoning (and discarding) the aqueous layer.

Other methods of separation would be known to the person skilled in the art. Any separation method that enables isolation of a fraction comprising the animal fat from the remainder of the mixture, and in particular, from the aqueous phase of the mixture, is suitable. Optionally, the fraction is isolated by centrifugation. Further optionally, the fraction is isolated by gravity separation such as settling or precipitating.

The isolation of the animal fat, and moreover, the removal of the aqueous phase, enables the removal of water-soluble odorous compounds such as fatty acids, and in particular, branched chain fatty acids from the fat. Other undesirable water-soluble materials and precipitates may also be removed from the fat during the isolation process, including the odorous compounds and molecules defined above.

The present inventors have unexpectedly found that the fraction comprising animal fat isolated according to the methods of the present invention enhances the palatability of food compositions. Thus, in one embodiment, a palatability enhancer is obtained from the isolated fraction comprising the animal fat.

Typically, the isolated fraction comprising the animal fat is in a liquid or paste form at room temperature (which is typically from 20° C. to 25° C.). Preferably, the isolated fraction comprises animal fat in an amount of at least 80 wt %, or at least 90 wt %. More preferably, the isolated fraction consists essentially of animal fat. Optionally, the isolated fraction may be used without any further processing as a palatability enhancer. Therefore, the isolated fraction comprising the animal fat may be added directly to a food composition.

Accordingly, the palatability enhancer obtained by the methods of the present invention may comprise animal fat in an amount of at least 80 wt %, or at least 90 wt %. Preferably, the palatability enhancer obtained by the methods of the present invention consists essentially of animal fat. Optionally, the isolated fraction comprising the animal fat is packaged for later use. Alternatively, the isolated fraction may be combined with one or more food ingredients as defined herein prior to its incorporation into a food composition.

The present invention further provides a food composition comprising at least one food ingredient, and a palatability enhancer obtained by the methods described herein.

Preferably, the food compositions of the present invention comprise at least one food ingredient. The at least one food ingredient may be selected from protein (for example, meat, meat-by products, dairy products, eggs, wheat protein, soy protein and potato concentrate), fat (for example, animal fat, fish oil, vegetable oil, meat and meat by-products), and carbohydrate (for example, grains such as wheat, corn, barley and rice). Other food ingredients include, without limitation, fiber (for example cellulose, beet pulp, peanut hulls and soy fiber), vitamins, minerals and preservatives. The food ingredient may be any food ingredient defined herein.

The food composition of the present invention may be suitable for consumption by any animal. Animals include human and non-human animals. Non-human animals include, without limitation, avians, bovines, canines, equines, felines, murines, ovines, and porcines.

Preferably, the food composition is for consumption by a canine or a feline.

Food compositions of the present invention can be prepared in a dry or wet form using conventional processes.

In one embodiment of preparing a dry food composition, dry ingredients, including animal protein sources, plant protein sources, and grains ground and mixed together. Moist or liquid ingredients, including fats, oils, animal protein sources, and water, are then added to and blended with the dry mix. The resulting mixture may then be processed into kibbles or similar dry food pieces using extrusion and cutting processes known to the person skilled in the art.

The isolated fraction obtained by the methods of the present invention may be added to the food composition during its normal preparation procedure such as mixing, extrusion, and baking. Preferably, it is added after the food composition has been prepared (for example, post extrusion), such as by spraying or coating the surface of the food. This is particularly desirable for dry foods wherein extruded strands of food may be contacted with the fraction comprising the animal fat by spraying or coating the extruded strands before the strands are cut into kibbles or pieces. Alternatively, the kibbles or pieces themselves may be contacted with the fraction comprising the animal fat by spraying, coating or dipping the kibbles or pieces per se.

In one embodiment of preparing a wet food composition, ground animal (e.g., mammal, poultry, fish and/or seafood) proteinaceous tissues are mixed with one or more other food ingredients, including fish oils, cereal grains, special purpose additives (e.g., vitamin and mineral mixtures, inorganic salts, cellulose and beet pulp, and bulking agents). Water sufficient for processing may also be added. The wet ingredients are typically mixed and heated to form a thick liquid, prior to canning and sterilization.

For wet foods, the fraction comprising the animal fat can be incorporated into the wet food composition prior to heating and cooking. Alternatively, the fraction comprising the animal fat can be mixed into the dry materials prior to forming the wet food composition.

The food composition of the present invention, when used for non-human animal consumption, may also be in the form of treats or toys. Treats of the present invention can be prepared by extrusion or baking processes that would be apparent to the person skilled in the art. The fraction comprising the animal fat may be used to either coat the exterior of existing treat forms, or it may be injected into an existing treat form. Non-human animal toys of the present invention are typically prepared by coating any existing toy with a fraction comprising the treated animal fat.

The present invention further provides a composition comprising:
80 wt % to 90 wt % animal fat,
1 wt % to 7 wt % water,
0.5 wt % to 3 wt % vegetable oil, 0.1 wt % to 3 wt % amino acids,
0.5 wt % to 3 wt % sugars,
0.1 wt % to 4 wt % flavorants,
0.01 wt % to 0.5 wt % vitamins, and
0.01 wt % to 0.5 wt % antioxidants.

Preferably, the composition comprises:
85 wt % to 88 wt % animal fat,
4 wt % to 6 wt % water,
1 wt % to 2.5 wt % vegetable oil,
0.5 wt % to 2 wt % amino acids,
1 wt % to 2.5 wt % sugars,
0.1 wt % to 2 wt % flavorants,
0.1 wt % to 0.3 wt % vitamins, and
0.1 wt % to 0.3 wt % antioxidants.

The amounts of animal fat, water, vegetable oil, amino acids, sugars, flavorants, vitamins and antioxidants may optionally be as defined herein, in any combination.

The composition comprising animal fat defined above may be processed according to the methods described herein, in order to reduce the odor of the animal fat and prepare a palatability enhancer.

The present inventors have found that when animal fat, and in particular, inedible animal fat, is treated with nutrients under high temperature and pressure conditions in an aqueous environment, undesirable, water-soluble compounds are retained in the aqueous phase, and the odor of the animal fat is significantly reduced. Moreover, the present inventors have unexpectedly found that the animal fat processed according to the methods of the present invention significantly enhances the palatability of food compositions.

The invention is further illustrated in the following non-limiting Examples.

Example 1

Table 1 illustrates a composition comprising inedible animal fat for use in the methods of the present invention.

TABLE 1

| Ingredient | Amount (wt. %) |
| --- | --- |
| Inedible animal fat | 87.2 |
| Water | 5 |
| Vegetable oil | 2 |
| Sugars | 2 |
| Amino acids | 1.5 |
| Flavorants | 2 |
| Vitamins | 0.25 |
| Antioxidant | 0.1 |

Example 2

A mixture comprising sugars, amino acids, flavorants and vitamins was prepared according to the amounts recited in Table 1. Water was blended in with these ingredients. Inedible pork fat (Choice White Grease), vegetable oil and further flavorants were combined with the mixture in amounts according to Table 1. Choice White Grease is a good candidate for making bacon or barbeque type flavors due to its pork-oriented aroma contents and small amounts of protein residuals. However, Choice White Grease is associated with pungent fecal an animal-like odors.

The resultant mixture was agitated in a high pressure flavor reactor and after closing the reactor, the temperature was raised to 109° C. The temperature was maintained at 109° C. for 25 minutes and the pressure inside the reactor was approximately 295 kPa. After 25 minutes, the temperature of the reactor was lowered to 66° C., the reactor was opened, and liquid antioxidant was added to the mixture in an amount of 0.1 wt %. The resulting composition corresponded to the composition of Table 1. The reactor contents were subsequently transferred to quart-sized plastic bottles, and the bottles were then centrifuged at 2000 rpm for 30 seconds. The aqueous layer ("heavy phase") and sedimented material was removed by siphoning into another vessel. The lipid layer ("light phase") comprising the treated animal fat was isolated and transferred to a 5-gal plastic polyethylene container for packaging. The treated animal fat had an aroma of bacon. The treated animal fat obtained in this Example is referred to hereinafter as "SBF" (sweet bacon flavor.) It was observed that SBF had a lighter color and a more polished appearance than untreated inedible animal fat. Typical offensive odors present in untreated inedible animal fat were greatly reduced. Both the brighter color and odor reduction may be attributed to the neutralization of some odorous fatty acids and the removal of dark-colored compounds in the aqueous layer, after centrifugation.

Example 3

Palatability tests were conducted using SBF obtained in Example 2. A sample of the present invention was prepared by incorporating SBF in an amount of 4 wt % into a commercially available canine jerky treat ("Test Sample.") For comparison, the following commercially available leading flavorants were separately incorporated into the same commercially available canine jerky treat:
1) Firmenich's Charbroil Flavor ("Charbroil Sample")
2) Firmenich's Bacon Flavor ("Bacon Flavor Sample")
3) Hormel's Bacon Fat ("Bacon Fat Sample")
Pup Peroni® Original Beef Recipe Canine Treat, a commercially available treat, was used as the control food for the palatability tests ("Control Sample.")

Palatablity tests were conducted to compare the palatability of each of the four prototype samples and the control composition using a 2-day feeding protocol with 25 dogs. Equal amounts of the Test Product or the Control Product were presented in two separate bowls and fed to the animal panelists at the same time. After 30 min of feeding, food samples were withdrawn and weighed. The difference in weight of each food sample between the initial amount and the remaining amount are the amounts consumed by the animal. The Intake Ratio is the ratio of either the amount of Test Product consumed or the amount of Control Product consumed vs. the total consumed amounts. A "win" is indicated when the averaged Intake Ratio of the Test Product is significantly greater than that of the Control Product at a probability of less than 0.05. A "loss" is indicated when the Intake Ratio of the Test Product is significantly less than that of the Control Product. "Parity" is indicated when the probability for both averages of the Intake Ratios (of either the Test Product or Control Product) is greater than 0.05. The probability of the average Intake Ratio of Test Food to be equal to that of the Control food is estimated using single tail f-distribution curve. The results are illustrated in Table 2. Food compositions resulting in a higher intake ratio are considered to have better palatability.

TABLE 2

(you may remove the Pref. % to minimize the confusion but include the verdict of the PAL test and r value to show the probability of Intake of Test food to be equal to that of the control).

| Test No | Test Product | Control Product | Intake Ratio | Verdict |
|---|---|---|---|---|
| 1 | Test Sample | Control Sample | 0.85 | Win p = 0.0001 |
| 2 | Bacon Flavor Sample | | 0.79 | Win p = 0.0001 |
| 3 | Bacon Fat Sample | | 0.72 | Win p = 0.0001 |
| 4 | Bacon Fat Sample | Charbroil Sample | 0.65 | Win p = 0.01 |
| 5 | Bacon Fat Sample | Test Sample | 0.33 | Loss p = 0.006 |
| 6 | Bacon Fat Sample | Bacon Flavor Sample | 0.53 | Parity p = 0.31 |
| 7 | Bacon Flavor Sample | Charbroil Sample | 0.37 | Loss p = 0.03 |
| 8 | Bacon Flavor Sample | Test Sample | 0.39 | Loss p = 0.02 |
| 9 | Test Sample | Charbroil Sample | 0.79 | Win p = 0.0001 |

As can be seen from Table 2, there was a significantly larger preference for the Test Sample comprising SBF as compared to the Control Sample (Pup Peroni® Original Beef Recipe Canine Treat.) Furthermore, the Test Sample comprising SBF had a higher intake ratio (IR) (0.85) than the food compositions comprising Firmenich's Bacon Flavor and Hormel's Bacon Fat (0.79 and 0.71, respectively), as tested against the Control Sample (Pup Peroni® Original Beef Recipe Canine Treat.)

Additionally, the Test Sample performed significantly better in the palatability tests than the other three flavorants with an IR of 0.79 (vs. Firmenich's Charbroil Flavor), 0.67 (vs. Hormel's Bacon Fat), and 0.61 (vs. Firmenich's Bacon Flavor), respectively.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material on a dry matter basis.

The invention claimed is:

1. A method of preparing a palatability enhancer for a food composition, the method comprising:

combining an animal fat source comprising animal fat and odorous compounds with one or more amino acids, one or more sugars, one or more vegetable oils, and water to prepare a mixture comprising an aqueous phase and a lipid phase, wherein the odorous compounds originate from decomposition of the animal fat and comprises odorous fatty acids;

heating the mixture at a pressure of 110 kPa to 800 kPa to a temperature of from 80° C. to 230° C.;

neutralizing the odorous fatty acids of the animal fat source to provide neutralized odorous fatty acids by adding a sufficient amount of an alkaline agent to the mixture; and obtaining a palatability enhancer from the mixture by separating the aqueous phase from the lipid phase comprising the palatability enhancer, wherein the palatability enhancer comprises the animal fat in an amount of at least 90 wt %.

2. The method of claim 1, wherein the animal fat of the animal fat source is not rendered or filtered before combining with the amino acids, the sugars, the vegetable oils, and water to prepare the mixture.

3. The method of claim 1, wherein the odorous compounds further comprise skatols, indoles, p-cresols, thiols, and biogenic amines.

4. The method of claim 1, wherein the odorous fatty acids comprise branched chain fatty acids.

5. The method of claim 1, wherein the odorous fatty acids comprise propionic acid, butyric acid, pentanoic acid, and hexanoic acid.

6. The method of claim 1, wherein the animal fat source is fabricated meat and/or offal from slaughtering.

7. The method of claim 1, wherein the animal fat source originates from one or more of cattle, poultry, horses, sheep, and pigs.

8. The method of claim 7, wherein the animal fat source originates from pigs.

9. The method of claim 1, wherein the mixture consists essentially of the animal fat source, the amino acids, the sugars, the vegetable oils, and water.

10. The method of claim 1, wherein the aqueous phase has a pH from 3 to 4.

11. The method of claim 1, wherein the aqueous phase has a pH of 3.

12. The method of claim 1, wherein the aqueous phase has a pH of 4.

* * * * *